United States Patent [19]

Yoneda et al.

[11] Patent Number: 5,717,803
[45] Date of Patent: Feb. 10, 1998

[54] COUPLING STRUCTURE OF OPTICAL FIBER AND OPTICAL SEMICONDUCTOR ELEMENT

[75] Inventors: Isao Yoneda; Junichi Sasaki; Masataka Itoh; Hiroshi Honmou, all of Tokyo, Japan

[73] Assignee: Nec Corporation, Tokyo, Japan

[21] Appl. No.: 747,817

[22] Filed: Nov. 13, 1996

[30] Foreign Application Priority Data

Nov. 13, 1995 [JP] Japan .................................. 7-293867

[51] Int. Cl.⁶ .................................................. G02B 6/36
[52] U.S. Cl. ........................... 385/89; 385/83; 385/92
[58] Field of Search ............................ 385/49, 88–94, 385/83

[56] References Cited

U.S. PATENT DOCUMENTS

| | | | |
|---|---|---|---|
| 5,412,748 | 5/1995 | Furuyama et al. | 385/92 |
| 5,548,673 | 8/1996 | Kitamura et al. | 385/49 |
| 5,557,695 | 9/1996 | Yamane et al. | 385/49 |

*Primary Examiner*—John Ngo
*Attorney, Agent, or Firm*—Sughrue, Mion, Zinn, Macpeak & Seas, PLLC

[57] ABSTRACT

The optical fibers are arranged in a V groove formed at the surface of a silicon substrate and a cover is provided thereon. An electrode for solder bump is respectively formed at the position opposed with each other to the substrate and cover. These substrate and cover are deposited with solder in order to fix the optical fibers. The substrate or cover is previously provided, at the end point part of the optical fibers, with the mark for the positioning in the longitudinal direction of the optical fibers. The optical fibers are positioned with this mark. Here, the side surface of the optical fibers is provided with the metallized area at the position located in the predetermined distance from the end point thereof. Before fixing with the cover, the optical fibers can be deposited automatically to the predetermined position without alignment due to the self-alignment effect between the mark and metallized area. Meanwhile, the optical element can be deposited with the solder bump without adjustment to the area near the end point of the optical fiber by utilizing the self-alignment. Here, it is also possible to form the mark to the substrate for measuring the mounting position of the optical element after deposition thereof.

13 Claims, 4 Drawing Sheets

COUPLING STRUCTURE OF OPTICAL FIBER AND OPTICAL SEMICONDUCTOR ELEMENT

BACKGROUND OF THE INVENTION

1. Field of the Invention

The present invention relates to a coupling structure of an optical fiber and an optical semiconductor element and particularly to a coupling structure of an optical fiber and an optical semiconductor element in an optical semiconductor module for optical transmission utilizing single or a plurality of optical fibers.

2. Description of the Related Art

With distinctive advancement in packing density and integration degree of an optical device to be used for optical communication, research and development have been extensively continued for a waveguide type optical device utilizing an optical waveguide. In such a waveguide type optical device, it is essentially required to mount an optical fiber with higher accuracy into a substrate on which a waveguide is formed.

Moreover, an optical parallel transmission system for transmission of data on the basis of space division of the transmission line using a plurality of optical fibers is suitable for transmission of a large amount of data between apparatuses such as computers. For the optical parallel transmission, an interface module for optical parallel transmission comprising a plurality of optical fibers is used. In the interface module, it is essential to optically realize effective and stable coupling of a plurality of light emitting elements or light receiving elements provided in parallel and a plurality of optical fibers.

In the waveguide type optical device, for example, explained above, the structure has been employed in which an optical fiber is fixed to a substrate with a bonding agent or the like after an optical fiber is arranged in the groove formed on the surface of the waveguide substrate. Otherwise, the structure has been utilized in which the optical fiber is fixed with another substrate provided covering the same. In addition, even in the optical interface module for optical parallel transmission, the structure has been proposed in which the optical fibers are fixed by adjustment in the positioning of the entire part of an optical element array arranged or formed in parallel with the substrate on which a plurality of optical fibers are arranged respectively in the grooves formed with the predetermined interval.

In the optical fiber fixing structure or its fabricating method of the related art, the optical fiber mounting position is determined while monitoring an optical power or a photo-current from the external circuit to realize the coupling with an optical element such as a light receiving element. Therefore, a longer time required for positional adjustment will be required until the mounting of the light receiving element. In addition, it is sometimes required that the light receiving element is mounted on a substrate while the electrode forming surface is placed downward. Therefore, it is difficult to match both electrode positions in such a structure.

Moreover, in regard to the mounting accuracy of an optical element, it is difficult to accurately measure the mounting accuracy of an optical element because a marker for measurement is not provided. Therefore, there is a problem that it is impossible to confirm whether a cause of optical coupling loss between the optical element and optical fiber is the mounting accuracy of the optical element or not.

Since the optical fiber mounting position is not designated on the substrate, when a V-groove formed on a silicon substrate, for example, by anisotropic chemical etching method is used, the mounting accuracy in the direction vertical to the longitudinal direction and in the depth direction is high. However, there is no means for defining the mounting position of the V groove in the longitudinal direction and the mounting position of the optical fiber cannot be determined apparently.

There is a further problem that bonding strength for fixing is rather weak because the optical fiber is fixed with a bonding agent only to a small area in contact with the V groove.

SUMMARY OF THE INVENTION

It is therefore an object of the coupling structure of an optical fiber and optical semiconductor element in the present invention to easily couple, without any power monitor, an optical fiber and optical element with high accuracy and reliability.

According to a coupling structure of an optical fiber and optical semiconductor element of the present invention, there are provided a first substrate having at least one first groove, an optical fiber arranged in the groove and a second substrate which is arranged in contact with the optical fiber at the upper part of the optical fiber. Moreover, the first substrate has a first mark formed in the vicinity of the groove, while the second substrate has a second mark provided opposed to the first mark and the first and second marks are fixed by the soldering.

Moreover, the first substrate is formed of silicon and the first groove is formed as the V-shaped groove. The V-shaped groove is formed on the first substrate by the anisotropic chemical etching method. In the second substrate, the second groove may be formed in contact with the optical fiber.

The first or second substrate is further provided with a third mark in the vicinity of the end point part of the optical fiber. The end point part of optical fiber is arranged at the position previously defined for the third mark.

In addition, an optical element to be coupled optically with the optical fiber has element electrodes. The first or second substrate also has a substrate electrode in the vicinity of the end point part of the optical fiber and the element electrode and substrate electrode are also fixed by the soldering. Moreover, a solder resist is also provided between the first mark and a connecting electrode connected to external circuits formed on the first substrate.

Since position of the optical fiber is determined depending on the mark patterned on the first and second substrate, the optical fiber can be mounted with higher accuracy and reliability. In addition, not only the optical fiber but also optical element such as light receiving element to be optically coupled with this optical fiber can be fixed by the solder bump and thereby these may be coupled can also be realized without monitoring the power. Moreover, the present invention is characterized in previously forming marks on the substrate to measure the mounting accuracy after the mounting of the optical element.

According to a coupling structure between the optical fiber and optical semiconductor element of the present invention, a pattern formed of a metal thin film is formed at a part of the V groove where the optical fiber is arranged. A metallized layer is also formed to a part of the side surface of the optical fiber bare line to be arranged in the V groove. Position of the metal thin film pattern is previously determined for the position where the light receiving element or the like is provided. Meanwhile, the end point part of the optical fiber is formed at the previously determined position.

With employment of such structure, when the optical fiber is mounted to the V groove of the substrate, the end point part of fiber matches the position of the light receiving surface of the light receiving element. Moreover, since the optical fiber is self-aligned in the longitudinal direction when the solder is fused and is then deposited, the positioning is possible without any particular positional adjustment of the optical fiber.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Figure 1:
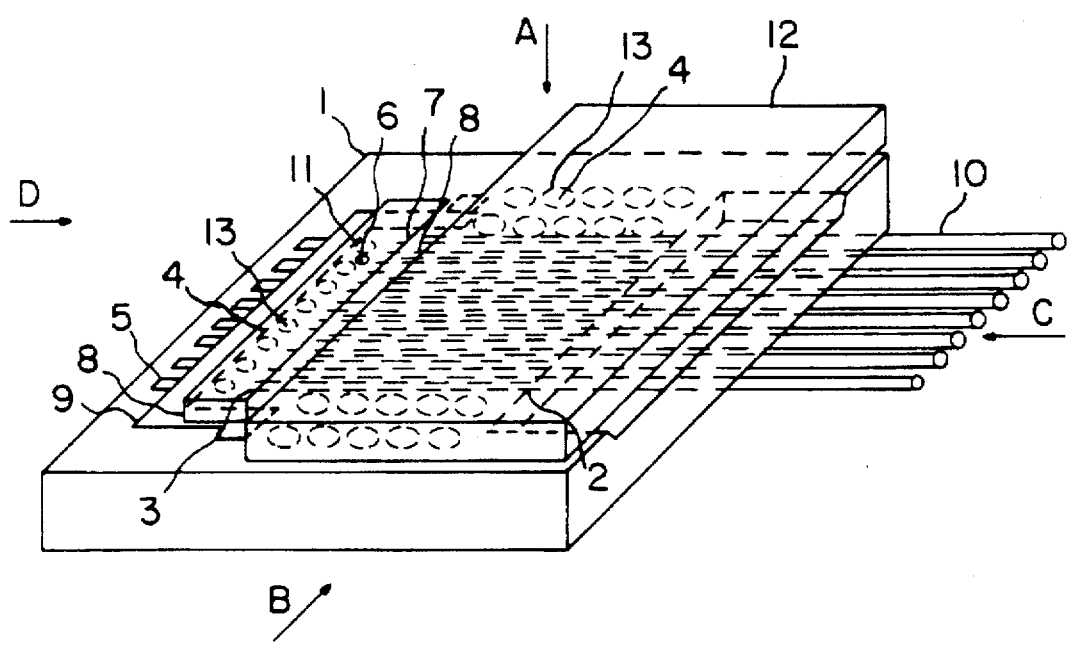
FIG. 1 is a perspective view showing an embodiment of the V-groove silicon substrate depending on the coupling structure of an optical fiber and optical semiconductor element of the present invention.
Figure 2:
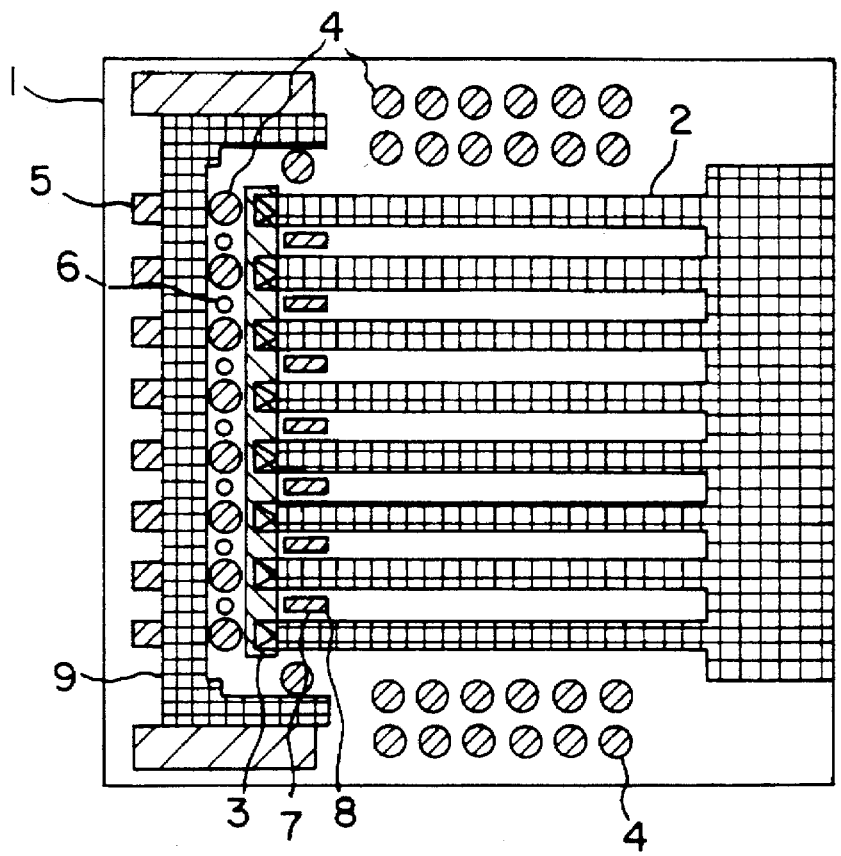
FIG. 2 is a plan view of the V groove silicon substrate shown in FIG. 1, observed from the direction A without the cover.
Figure 3:
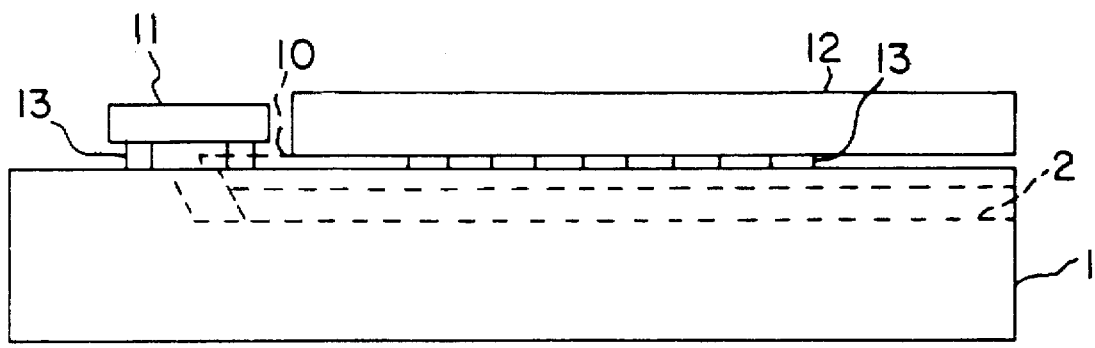
FIG. 3 is a plan view of the V groove silicon substrate shown in FIG. 1, observed from the direction B.
Figure 4:
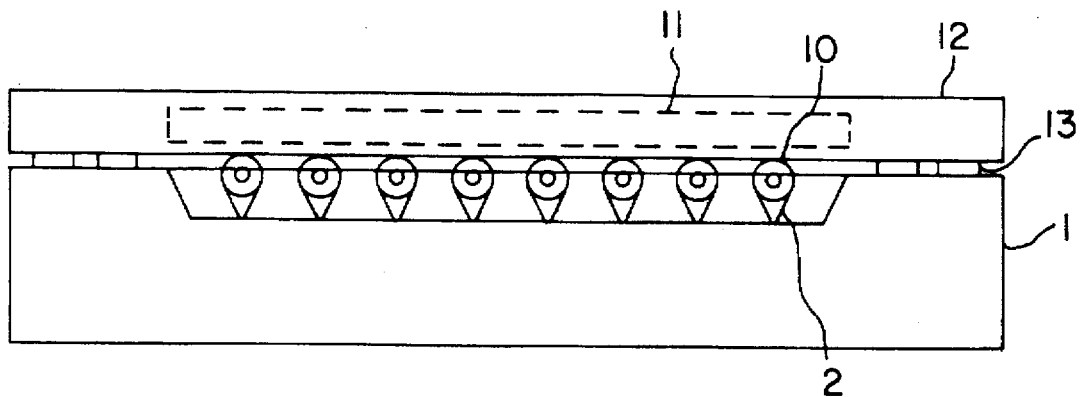
FIG. 4 is a plan view of the V groove silicon substrate shown in FIG. 1, observed from the direction C.
Figure 5:
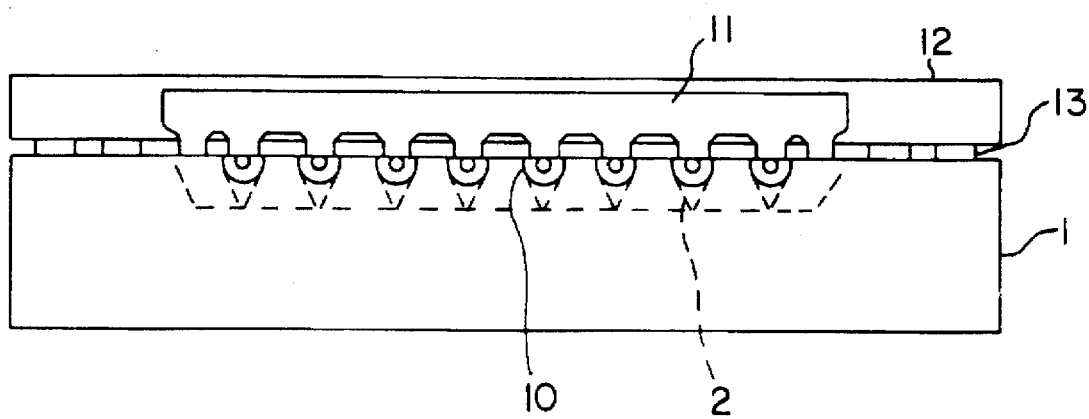
FIG. 5 is a plan view of the V groove silicon substrate shown in FIG. 1, observed from the direction D.

FIG. 1 shows a coupling structure of an optical fiber and an optical semiconductor element of the present invention which will be explained in detail with reference to the accompanying drawing.

FIG. 1 to FIG. 5 are diagrams for explaining a structure of the first embodiment of an optical fiber fixing structure of the present invention. FIG. 1 is a perspective view of a V groove silicon substrate. FIG. 2 to FIG. 5 are respectively plan views of FIG. 1, observed from the directions A to D.

In the V groove silicon substrate shown in FIG. 1 to FIG. 5, an optical reflection thin film 3, for example, a metal thin film of chromium/gold, titanium/gold, etc. is formed at one end of the V groove 2 on the silicon substrate 1. A solder resist 9 is formed on a conductive metal wiring pattern connecting a solder bump electrode 4 and an external connecting electrode 5. In both sides of the V groove 2, the solder bump electrodes 4 are formed to join the cover 12 with the solder bump 13 and an optical fiber mounting position aligning marker 7 is formed to the flat land area of the V groove 2.

The V groove 2 for mounting the optical fiber 10 is patterned into the predetermined form on the silicon substrate 1 and is then soaked into the etchant such as potassium hydroxide for the chemical anisotropic etching. In this embodiment, the patterning has been performed in the pitch of 250 μm and width of 170 μm to form the V groove with higher accuracy depending on various design specifications. The V groove 2 is formed of a silicon substrate having the cutting angle to provide the top angle of 70.6 degrees with respect to the substrate. Since matching is performed using a thermal oxide film as the mask, the V groove at the surface of substrate can be controlled with the width of mask. Since the inclination angle is determined, depth of the V groove 2 can be defined in high accuracy with the groove width.

Meanwhile, the optical fiber mounting position aligning marker 7 is formed at the land area of the adjacent V grooves 2 to mount the optical fibers 10 with good accuracy in the vertical direction of the V groove 2. When the optical fiber 10 is arranged to the V groove 2, the position in the lateral direction is determined and moreover the end face of the optical fiber 10 is fine-adjusted for the arrangement in the vertical direction with reference to the position of the optical fiber mounting position aligning marker 7.

While observing the silicon substrate 1 on which the V groove is formed from the direction A in FIG. 1, the end point surface of the optical fiber 10 is fed to be matched with one side of the optical fiber mounting position aligning marker 7. Thereby, the position in the vertical direction is determined. On the other hand, the positioning in the depth direction is performed in such a manner that since the optical fiber is pressed from the upper direction with a cover 12, the V groove 2 and optical fiber 10 are surely placed in contact with each other and then fixed. Therefore, the position of mounting the optical fiber 10 is determined automatically for all directions. After the cover 12 is provided, the silicon substrate 1 as a whole is heated to dissolve the solder bump 13 and the substrate 1 is cooled, completing the mounting of the optical fiber 10.

In the present invention, a metal plate has been used for the cover 12, but it is only an example, and the silicon substrate may also be used. Moreover, it is also possible to previously form the grooves in the predetermined interval in the side of cover 12 so that the optical fiber may be pressed extensively after the fixing.

In the case where the optical fiber 10 is fixed to the V groove 2 with a bonding agent, the contact area between the optical fiber 10 and V groove 2 is rather small. Since the optical fiber 10 is fixed only at two points of the external circumference, it is rather weak and has lower reliability for the force in the upper direction. Therefore, it is required to fix the optical fiber at three points by pressing downward the optical fiber 10 to the V groove 2 through contact with the optical fiber 10 from the upper direction.

According to the present invention, since the optical fiber 10 is joined with the solder bump electrodes 4 formed in both sides of the V groove 2 on the silicon substrate 1 and a metal plate using the solder bump 13 from above the optical fiber 10, one optical fiber 10 is fixed through at least three points in contact, resulting in extensive fixing strength. In addition, when the solder fuses, the optical fiber 10 is pressed with the cover 12 and it is always pressed by thermal compression property of solder even while the solder is cooled.

At the inclined surface in one end part of the V groove 2, a light reflection metal thin film 3 having a higher reflectivity is formed. The optical beam emitted from the end face of the optical fiber 10 is once reflected by one end of the V groove 2 and then can be folded upward.

A light receiving element 11 must be mounted with higher accuracy so that the light receiving surface is located at the center of the optical beam reflected from one end of the V groove 2. For this purpose, the solder bump electrode 4 of silicon substrate 1 is arranged to match the electrode of the light receiving element 11. The solder bump electrode 4 is shaped into a circular form in diameter of 70 μm so that the surface tension works uniformly within the plane in parallel to the surface of the silicon substrate 1.

A light receiving element mounting position aligning marker 8 at the land area of the V groove 2 is used for alignment of the mounting position when the light receiving element 11 is mounted to the silicon substrate 1.

The light receiving element 11 does not always require the higher accuracy when it is mounted on the silicon substrate 1. The light receiving element 11 is mounted and fixed to the predetermined position with a higher accuracy owing to a surface tension of the solder fused when the solder bump 13 provided on the surface of the silicon substrate 1 is joined with the electrode of the arrayed light receiving element via the fused solder bump.

Since the light receiving element 11 is mounted on the silicon substrate 1 with the surface placed downward under the normal temperature, the light receiving element 11 can be mounted in accordance with the light receiving element mounting position aligning marker 8. When the light receiving element 11 is mounted on the solder bump 13 formed on the silicon substrate 1, higher mounting accuracy is not required and when the solder bump 13 is fused by heating the silicon substrate 1, the fused solder draws the electrodes. Therefore, it is enough when the solder bump 13 is slightly in contact with the electrode of the light receiving element 11.

Since an electrical signal photoelectrically converted by the light receiving element 11 flows through the electrode on the silicon substrate 1, an external connecting electrode 5 is arranged to extract the signal to the external circuits and these electrodes are connected with a conductive metal thin film. Moreover, a solder resist 9 is formed on the conductive metal thin film connecting such electrodes so that the fused solder bump 13 does not flow to the external connecting electrode 5.

Since the light receiving element 11 must be mounted on the silicon substrate 1 with higher accuracy, a metal thin film 6 for measuring the light receiving element mounting accuracy is formed in the area where the light receiving element 11 is mounted on the silicon substrate 1, in view of measuring the mounting accuracy after the mounting. The mounting accuracy of the light receiving element 11 may be measured through image processing of the image obtained from the reflected light beam when the infrared beam is radiated from the direction A.

The embodiment explained above is only an example of the present invention and various embodiments may of course be considered. For example, the substrate may have the U-shape groove in place of the V-shape groove and moreover the substrate may also be applied to the coupling with the light emitting element in place of the light receiving element.

As explained above, the optical fiber mounting structure and fabrication method of the present invention is not only capable of mounting an optical fiber with higher accuracy because a mark is provided on the substrate but also mounting the optical fiber in the longitudinal direction with higher accuracy because a mark is also provided in the vicinity of the end point area. Accordingly, the positioning can be made for the mounting without power monitoring for three directions.

Moreover, since the optical fiber is fixed under the condition that it is pressed from above with a metal plate, the electrode pad to form solder bumps in both sides of the V groove is provided and the optical fiber is fixed at least three points in total including at least one point in contact with the cover 12 and two points of the V groove. Therefore, the optical fiber is fixed with equal force working toward the center of the fiber. Furthermore, since the optical fiber is fixed with the solder, the fixing force is higher than that when only the bonding agent used. The elements to be mounted are all fixed with the solder, resulting in extensive fixing strength and reliability.

Further, a marker for measuring mounting accuracy of light receiving element is provided to easily survey whether the optical coupling loss greatly depends on the mounting accuracy or not. Since a solder resist is provided between the solder bump electrode and external connecting electrode, the fused solder flows only to the junction electrode pad. Accordingly, since the amount of solder required for self-alignment is secured and a surface tension is never lowered, higher mounting accuracy of the light receiving element can be maintained.

The marker is provided depending on the position of the light receiving element to be mounted. Therefore, the electrode positions of the light receiving element and silicon substrate can be matched easily without confirming the electrode position of the light receiving element. Since a reflection film to reflect the light beam emitted from the end point of the optical fiber is provided at the end face of the V groove, the light beam can effectively be incident to the light receiving element. In addition, less number of parts are required for coupling between the optical fiber and light receiving element. Mounting of the optical fiber into the V groove with higher mounting accuracy makes unnecessary the adjustment of optical axis and simplifies the fabrication process.

Here, a light receiving element is explained, as an example, as the optical semiconductor element in this embodiment, but this invention can also be applied to an LED and surface light emitting type semiconductor laser device.

Next, a second embodiment of the coupling structure of optical fiber and optical semiconductor element of the present invention will be explained with reference to FIG. 6 to FIG. 8.

Figure 6:
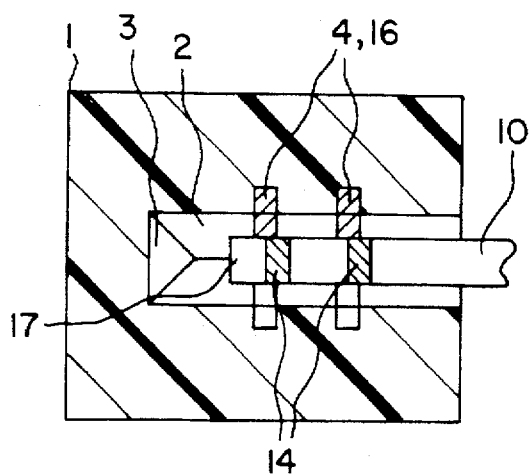
FIG. 6 is an upper surface view showing the condition before the fixing in the diagram showing positioning and fixing of an optical fiber of the second embodiment of the coupling structure of an optical fiber and optical semiconductor element of the present invention.

FIG. 6 is an upper surface view showing the condition before the fixing in the diagram showing positioning and fixing of an optical fiber of the second embodiment of the coupling structure of an optical fiber and optical semiconductor element of the present invention.

Figure 7:
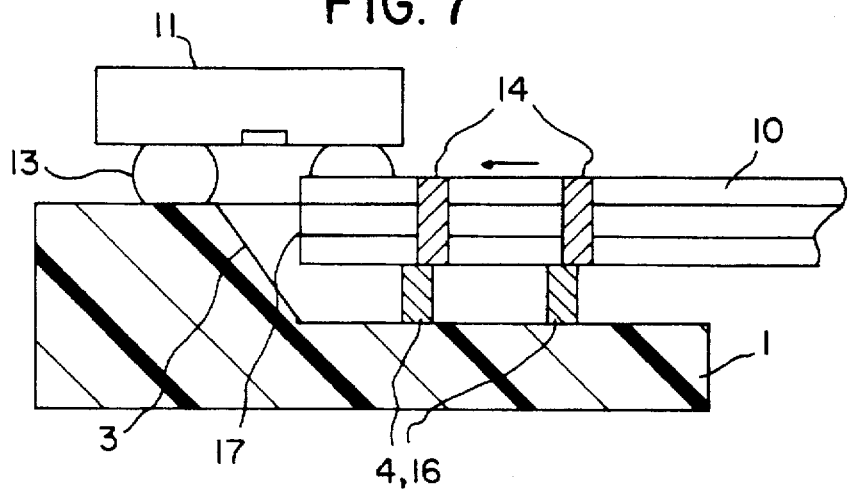
FIG. 7 is a diagram showing a vertical cross-sectional view of the upper surface view shown in FIG. 6.

FIG. 7 is a diagram showing a vertical cross-sectional view of the upper surface view shown in FIG. 6. The reference numerals used in this embodiment are similar to those used in the first embodiment.

This embodiment is characterized in that the optical fiber 10 is self-aligned in the longitudinal direction when it is arranged and fixed to the V groove 2 of the substrate 1. In the vicinity of the V groove 2 of the substrate 1, belt type metal thin films 4, 16 are formed in the direction vertical to the V groove. On the other hand, the belt type metallized areas 14 are formed in both sides of the optical fiber 10.

The optical fiber 10 is cut at the end point area 17 so that this position is located at the distance previously determined for the metallized area 14. Such positioning and cutting with higher accuracy as explained above can be realized easily using a blade saw which is usually used for cutting a semiconductor substrate.

The metal thin films 4, 16 are coated with solder and the optical fiber 10 is arranged on the V groove 2 almost resulting in alignment of the metallized areas 14. Thereafter, the substrate is heated and then cooled. With this process, the optical fiber 10 is fixed within the V groove 2 of the substrate 1. Here, when the solder is fused, the position where a metal thin film 4, 16 is formed is matched with the positions of the metallized areas 14, through self-alignment with the surface tension of solder. As a result, after these are fixed, the end point area of the optical fiber 10 can be positioned with higher accuracy to the predetermined position for the light reflecting surface 3.

FIG. 7 is a vertical cross-sectional view of the upper surface view of FIG. 6, cut along the center axis of the optical fiber.

FIG. 7 also shows the condition before the fixing, where the metallized areas 14, of the optical fiber 10 are deviated from the area on the substrate 1 where metal thin film 4, 16 is formed. However, when the solder (not illustrated) fuses, these are matched because a force works in the direction of the arrow mark due to the surface tension of the solder.

Figure 8:
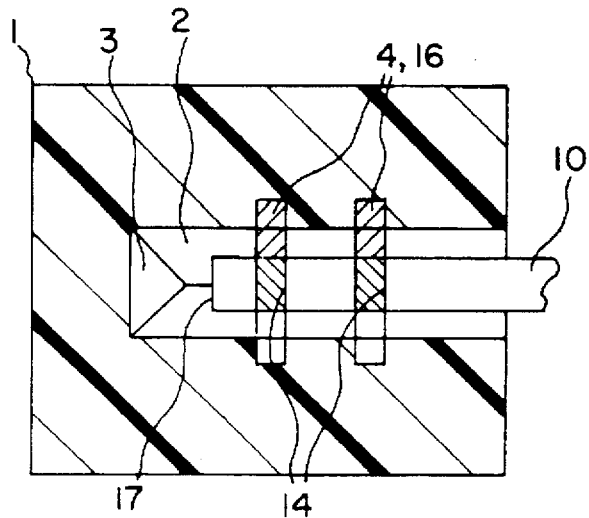
FIG. 8 is an upper surface view showing the condition after the fixing in the diagram surface view showing the condition before the fixing in the diagram showing positioning and fixing of an optical fiber of the second embodiment of the coupling structure of an optical fiber and optical semiconductor element of the present invention.

FIG. 8 is the upper surface view showing the condition after the fixing in the diagram showing the condition for positioning and fixing the optical fiber utilizing a coupling structure of the optical fiber and optical semiconductor element of the present invention. As a result of the process explained above, position of the end face surface 17 of the optical fiber 10 can be set in the vicinity of the light reflecting surface 3 to couple the emitted light to the light receiving surface of the light receiving element 11 with higher accuracy.

The second embodiment shows a coupling structure utilizing the self-alignment effect of the optical fiber, but it is also possible to utilize in combination this structure and the structure using the cover 12 explained in the first embodiment.

As explained above, in the coupling structure of the optical fiber and optical semiconductor element of the present invention, the optical fibers are respectively arranged in the V grooves 2 formed on the surface of the silicon substrate 1 and the cover 12 is placed thereon from the above direction. The substrate 1 and cover 12 are respectively provided with the electrodes 14 for solder bump 13 at the positions opposed with each other. The substrate and cover are fixed with each other with the solder to fix the optical fiber. The mark 7 for positioning in the longitudinal direction of the optical fiber is previously formed at the end point area of the optical fiber of the substrate 1 or cover 12 and the optical fiber is positioned with this mark 7. Therefore, highly accurate positioning and mounting of the optical fiber can be realized.

The optical fiber 10 is provided, at its side surface, with the metallized area 14 at the position in the predetermined distance from the end part thereof. Before fixing with the cover 12, the optical fiber can be fixed automatically at the predetermined position without alignment due to the self-alignment effect between the mark 7 and metallized area 14. Meanwhile, the optical element 11 can be fixed without adjustment using the self-alignment with the solder bump 13 at the area near the end point of the optical fiber 10.

Moreover, it is also possible to form, to the substrate 1, the mark 8 for measuring the mounting position of the optical element 11 after it is deposited. With these structures, the coupling structure of optical fiber and optical semiconductor element which assures simplified coupling of optical fiber and optical element with higher accuracy and reliability can be realized.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit of the following claims.

What is claimed is:

1. A coupling structure of optical fibers and optical semiconductor element, comprising:

a first substrate having at least one first groove;

optical fibers respectively arranged to said groove;

a second substrate arranged in contact with said optical fibers at the upper part of said first substrate; whereby said first substrate has a first mark formed in the vicinity of said groove;

said second substrate has a second mark formed at the position opposed to said first mark; and said first mark and second mark are fixed with solder.

2. A coupling structure of optical fibers and optical semiconductor element as set forth in claim 1, wherein said first groove is the V-shape groove.

3. A coupling structure of optical fibers and optical semiconductor element as set forth in claim 2, wherein said first substrate is formed of silicon.

4. A coupling structure of optical fibers and optical semiconductor element as set forth in claim 3, wherein said V groove is formed by anisotropic chemical etching of said first substrate.

5. A coupling structure of optical fibers and optical semiconductor element as set forth in claim 2, wherein said second substrate is provided with second grooves at the area in contact with said optical fibers.

6. A coupling structure of optical fibers and optical semiconductor element as set forth in claim 2, wherein said first or second substrate is further provided with a third mart at the area near the end point of said optical fiber and the optical fiber arranged to said first substrate is located previously to the predetermined position for said third mark.

7. A coupling structure of optical fibers and optical semiconductor element as set forth in claim 6, wherein said coupling structure of optical fibers and optical semiconductor element is further provided with an optical semiconductor element for optically connecting an element electrode and said optical fiber; said first or second substrate has a substrate electrode at the area near the end point of said optical fiber; and said element electrode and said substrate electrode are deposited by the solder.

8. A coupling structure of optical fibers and optical semiconductor element as set forth in claim 2, wherein a solder resist is provided between said first mark and a connecting electrode to be connected to external circuits formed on said first substrate.

9. A coupling structure of optical fibers and optical semiconductor element as set forth in claim 1, wherein said optical semiconductor element is a light receiving element.

10. A coupling structure of optical fibers and optical semiconductor element as sit forth in claim 1, wherein said optical semiconductor element is a light emitting element.

11. A coupling structure of optical fibers and an optical semiconductor element, comprising:

a first substrate having at least one first groove; and optical fibers to be arranged in said first groove; whereby at least one metal thin film pattern is formed at a predetermined position near said groove wherein said at least one of metal thin film pattern has a length shorter than that of said groove measured in a longitudinal direction;

said optical fiber is provided, at its side surface, with a metallized area having the same length as that of said at least one metal thin film pattern at the predetermined position; and said first substrate and said optical fibers are fixed by a solder deposited to said at least one metal thin film pattern and said metallized area.

12. A coupling structure of optical fibers and optical semiconductor element as set forth in claim 11, wherein said metal thin film has a vertical belt type shape in the groove direction and said metallized area has a vertical belt type shape for said optical fibers.

13. A coupling structure of optical fibers and optical semiconductor element as set forth in claim 12, wherein said coupling structure of optical fibers and optical semiconductor element further comprising a second substrate to be arranged in contact with said optical fibers at the upper part of said optical fibers; said first substrate has a first mark formed at the area near said groove; said second substrate has a second mark at the position opposed to said first mark and said first and second marks are deposited by the solder.

* * * * *